May 29, 1962     E. H. PARKHURST, JR     3,036,868
EMERGENCY SAFETY BRAKE ACTUATOR FOR TRAILER VEHICLES WHILE IN TRANSIT
Filed June 5, 1961     2 Sheets-Sheet 1
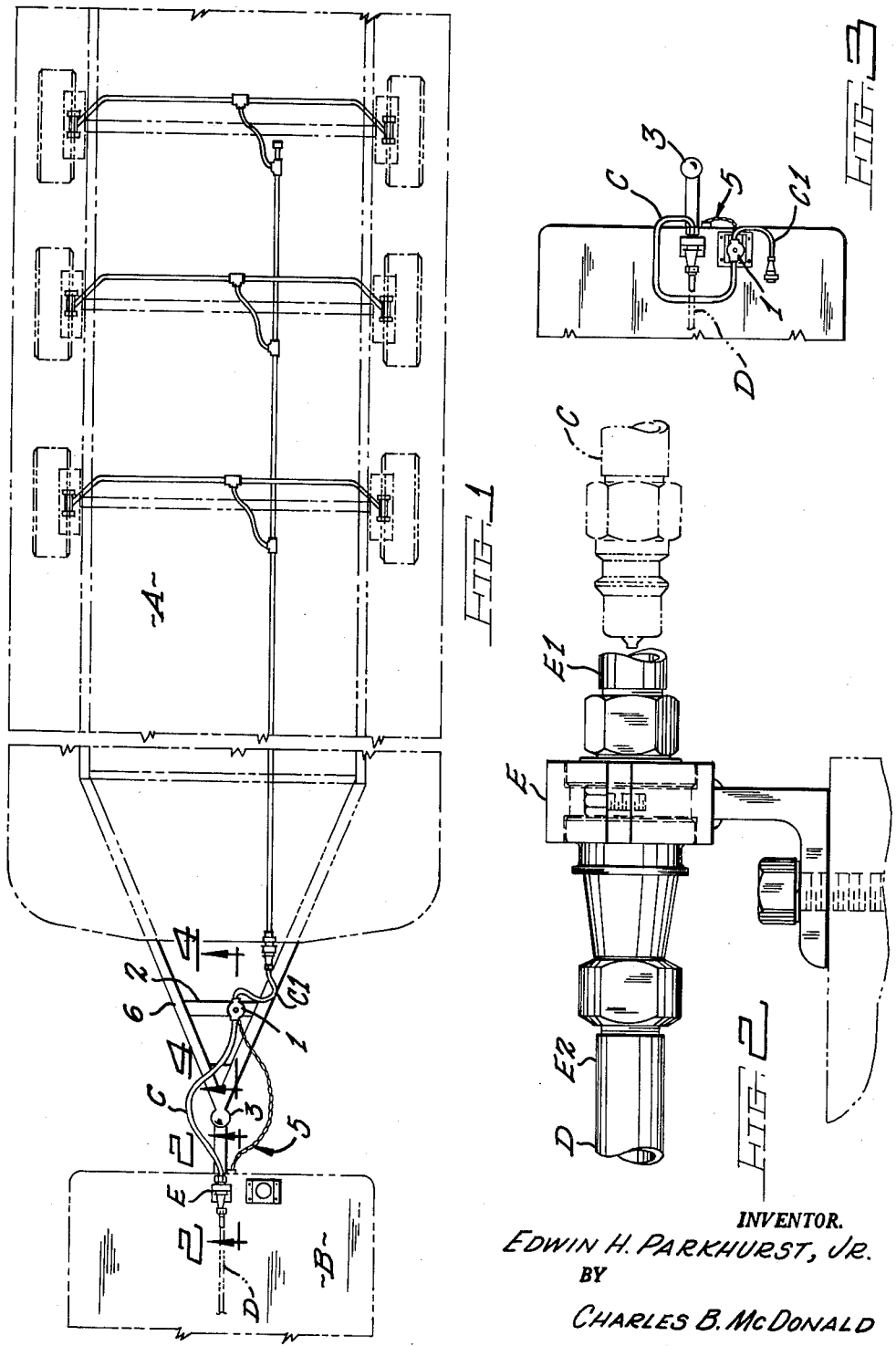
INVENTOR.
EDWIN H. PARKHURST, JR.
BY
CHARLES B. McDONALD
AGENT

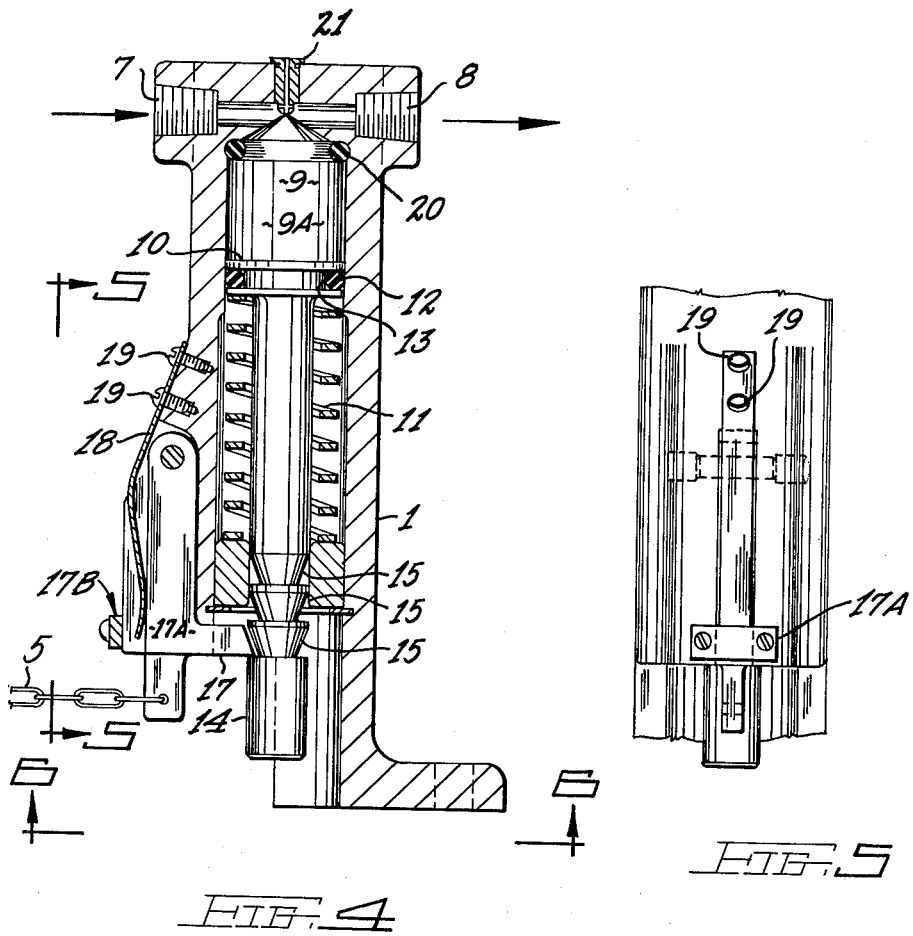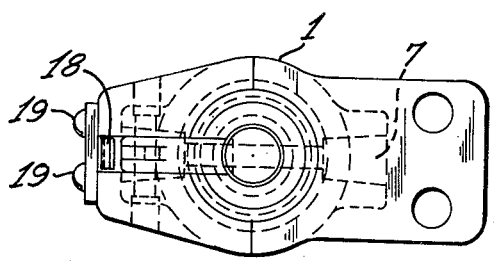

United States Patent Office 3,036,868
Patented May 29, 1962

3,036,868
EMERGENCY SAFETY BRAKE ACTUATOR FOR TRAILER VEHICLES WHILE IN TRANSIT
Edwin H. Parkhurst, Jr., Cleveland Heights, Ohio, assignor to Park Manufacturing Company, Cleveland, Ohio
Filed June 5, 1961, Ser. No. 114,853
3 Claims. (Cl. 303—2)

This invention relates to a vehicle braking system and more particularly to an improved trailer emergency safety brake actuator operating means rendered effective in the event of an accidental breakaway of the trailer from its towing vehicle.

The principal object of the invention is to provide a simple inexpensive emergency brake actuator that can be easily and quickly installed in combination with the present hydraulic braking systems of towing tractors and trailer vehicles, and fulfills a requirement for a safety brake device for the safe movement of large semi-permanent type of mobile homes and other type trailers which in most cases are delivered to the dealers' lot and thence to their permanent sites by professional haulers.

Another object of the invention is to provide a safety emergency brake actuator effective to automatically and instantly set the brakes of the trailer vehicle in the event the trailer accidentally becomes disconnected from its towing vehicle while in transit, without in any way interfering with the normal operation of the present hydraulic braking systems of the towing and tractor vehicle.

Another important object of the present invention is to provide a safety brake actuating means for trailer braking systems which employs an accumulator for storing a quantity of brake fluid, and automatic mechanical means for discharging said fluid under pressure into the hydraulic trailer brake lines to apply the brakes of the trailer instantly in the event the trailer inadvertently becomes disconnected from its towing vehicle while in transit.

Another object of the invention is to provide an emergency safety brake actuator that employs automatic mechanical movement independent of the vehicle operator to instantly and efficiently apply the trailer brakes in the event of accidental breakaway of the trailer from its towing tractor while in transit.

A still further object of the present invention is to provide an emergency safety mechanically operated safety trailer brake actuator removably mounted on a trailer while in transit and means for storing said actuator on the towing vehicle when not in use for towing trailer and thereby providing said actuator for attachment to as many trailers as desired to be moved by one towing vehicle.

With the foregoing objects in view, together with such other objects and advantages as may subsequently appear, the invention resides in the parts, and in the construction, combination and arrangement of parts described in the following specification; reference being had to the accompanying drawings which form a part of said specification and in which drawings:

FIG. 1 is a diagrammatic view of the connected braking systems of a towing vehicle and an attached trailer vehicle and showing the point of installation of the present actuator device.

FIG. 2 is a side elevation of quick release hydraulic coupling.

FIG. 3 is a top elevation view showing the placement of the actuator when stored on the towing vehicle.

FIG. 4 is a sectional view of the actuator taken through lines 4—4 of FIG. 1.

FIG. 5 is a side elevation of the actuator taken through lines 5—5 of FIG. 4.

FIG. 6 is a bottom elevation along lines 6—6 of FIG. 4.

The illustrated embodiment of the invention comprises housing 1 removably mounted on cross member 2, or any other convenient place on the trailer vehicle A, which is shown connected to towing vehicle B, partly shown in FIG. 1 by hitch 3 attached to trailer tongue 6 and safety breakaway chain 5. Braking fluid is conducted to the hydraulic braking system of the trailer A through hose C which is connected to hose D, connected to hydraulic lines not shown of the hydraulic braking system of the towing vehicle B. Hose members C and D are connected together by self sealing snap on coupling E. The male end E–1 is connected to the hydraulic brake line of the trailing vehicle. The female end E–2 is connected to the hydraulic brakeline of the towing vehicle. This coupling is a standard self sealing type of quick disconnect, such as manufactured by Airoquip and presently used on trailers to connect the brake lines of the towing and trailer vehicles. Both the male end E–1 and the female end E–2 are fitted with seals which automatically seal the fluid in both the towing and trailer hydraulic braking systems when disconnected with negligible pressure drop.

Housing 1 is provided with inlet port 7 and outlet port 8 located at the upper end of said housing member 1. Hose C is connected to inlet port 7 and hose C–1 is connected to outlet port 8 at one end thereof and to the hydraulic line of the trailer braking system at the other end, which provides means whereby the trailer brakes are operated in unison with the towing vehicle brakes by the operator of the towing vehicle. Inlet port 7 and outlet port 8 connect with hydraulic cylinder 9 within housing 1. Piston 10 is reciprocally mounted within hydraulic cylinder 9. O ring 12 is received in groove 13, and provides a seal for piston 10. O ring 20 provides a bumper stop to prevent piston 10 from being damaged by striking bottom of hydraulic cylinder 9. Bleeder screw 9 is provided to open an outlet for removal of air from hydraulic cylinder 9. Piston rod 14 is provided with detent grooves 15 arranged to receive pawl 17 which is pivotally mounted and supported by bracket 17–A. Arm 17–A is urged toward piston rod 10 by spring 18, which is secured to housing 1 by screws 19. Safety breakaway chain 5 is connected to towing vehicle B and to trailer A and is also connected to pawl 17. Piston 10 is urged to its uppermost position by compression spring 11. When the trailer A is connected to the towing vehicle B and hoses C, C–1 and D are connected to the braking systems of the towing and trailer vehicles, the foot lever of the hydraulic braking system of the towing vehicle is pressed downward strongly one or more times. First the hydraulic brake lines will be filled and the brake shoes of the trailer will be expanded against the braking surface of their drums. Continuing pressure on said brake lines will force brake fluid into hydraulic cylinder 9 which becomes an accumulator 9–A, as the pressure continues piston 10 is forced downward against spring 11 to its farthest downward position and accumulator 9–A is filled with brake fluid. Pawl 17 will then engage one of the several detent grooves 15 and hold piston 10 in operative position. The device is now ready to function. In the event trailer A accidentally becomes unattached from the towing vehicle B, the said quick disconnect coupling E will automatically separate when a predetermined force is applied. The safety breakaway chain being longer than the hose member C will then tighten and disconnect pawl 17 from the engaging detent 15 and permit the spring 11 to instantly cause piston 10 to move upwardly with great force, discharging the fluid stored in accumulator 9–A into the hydraulic brake system of the trailer and effectively applying the trailer brakes.

Operation of the present invention is: Accumulator space 9–A is provided to receive a quantity of brake fluid when piston 10 is held in its furthest downward position by pawl 17 engaging one of detents 15, in the event the trailer is accidentally disconnected from its towing vehicle, check valves in coupling E automatically seal the broken lines and subsequently pawl 17 is disengaged from detent 15 by breakaway chain 5 and piston 10 is automatically released independent of the operator of the towing vehicle, discharging the fluid stored in accumulator 9-A with great force into the trailer braking system. It is to be noted that at no time except when the brakes are applied is there any pressure in hydraulic cylinder 9. The storage of the energy is entirely mechanical and the hydraulic brake systems of both the towing and trailer vehicles operate in the same normal manner as they would had the present invention not been installed.

Although a particular embodiment of my invention has been described, it will be understood by those skilled in the art that the object of the invention may be attained by use of constructions different in certain respects from that disclosed without departing from the underlying principles of the invention. I, therefore, desire by the following claims to include within the scope of my invention all such variations and modifications by which substantially the results of my invention may be obtained through the use of substantially the same or equivalent means.

What I claim is:

1. An emergency trailer brake system consisting of

An assembly including a housing arranged to be attached to a trailer vehicle,

A hydraulic cylinder within said housing,

An inlet port at the upper end of said cylinder,

Fluid conducting means arranged to be connected to said inlet port and the master cylinder of the hydraulic braking system of a towing vehicle, a coupling including automatic disconnect means and check valves located between the ends of said fluid conducting means, An outlet port at the upper end of said cylinder, Fluid conducting means connecting said outlet port with the hydraulic braking system of a trailer vehicle, A piston having a shaft of a diameter smaller than said piston arranged to be fitted in said hydraulic cylinder, Spring means constantly urging said piston toward said ports, A plurality of detents formed on the periphery of said shaft, A pawl member secured to said housing, Manually operated means associated with the master cylinder of the hydraulic braking system of a towing vehicle to force the brake fluid through said fluid conducting means and said inlet port whereby said piston is forced away from said ports as the space between said piston and ports is pressurized, Means to engage said pawl with one of said detents whereby said piston is securely held in retarded position against said spring, Means to automatically release said pawl from engagement with said detent in the event the trailer vehicle becomes accidentally unattached from its towing vehicle, Means for unattaching said assembly from said trailer vehicle and storing it on a towing vehicle.

2. An emergency trailer brake actuator consisting of

An assembly including a housing,

A cylindrical bore open at one end thereof within said housing,

Inlet and outlet ports located at the other end of said bore,

A piston within said bore,

Spring means to urge said piston toward said ports,

Conduit means connecting said outlet port with the hydraulic braking system of a trailer vehicle, manually operated means associated with the master cylinder of the hydraulic braking system of a towing vehicle to force the brake fluid through said fluid conducting means and said inlet port whereby said piston is forced away from said ports as the space between said piston and ports is pressurized, A coupling including automatic disconnect means and check valves located between said master cylinder and said inlet port, Means to retain said piston and spring within said bore, Means to automatically release said piston from its retained position in the event the trailer vehicle becomes accidentally unhitched from its towing vehicle whereby said stored brake fluid will be discharged under pressure through said outlet port and said conduit to the hydraulic brake system of a trailer vehicle.

3. An emergency trailer brake system consisting of

An assembly including a housing arranged to be removably attached to a trailer vehicle, A hydraulic cylinder within said housing, Inlet and outlet ports located at one end of said cylinder, Conduit means associated with the master cylinder of the hydraulic braking system of a towing vehicle, Conduit means extending from said outlet port to the hydraulic braking system of a trailer vehicle, A piston having a shaft of smaller diameter than said piston extending outwardly from one end thereof, manually operated means associated with the master cylinder of the hydraulic braking system of a towing vehicle to force the brake fluid through said conduit means and said inlet port whereby said piston is forced away from said ports as the space between said piston and ports is pressurized, A coupling including automatic disconnect means and check valves located between said master cylinder and said inlet port, A plurality of detents formed on the outer periphery of said shaft, Spring means to urge said piston toward said ports, Pawl means mounted upon said housing, Means to engage said pawl with one of said detents, Means to release said pawl from engagement with said detent whereby said spring will force said piston outwardly and discharge said brake fluid under pressure out of said outlet port into the hydraulic braking system of said trailer vehicle.

References Cited in the file of this patent

UNITED STATES PATENTS

| 2,814,363 | Phillips | Nov. 26, 1957 |
| 2,966,965 | Stair | Jan. 3, 1961 |

FOREIGN PATENTS

| 523,063 | Italy | Apr. 13, 1955 |